United States Patent
Lu

(10) Patent No.: US 10,260,286 B2
(45) Date of Patent: Apr. 16, 2019

(54) IMPACT ICE DRILLER

(71) Applicant: Ningbo Ngp Industry Co., Ltd., Ningbo (CN)

(72) Inventor: Limeng Lu, Ningbo (CN)

(73) Assignee: Ningbo NGP Industry Co., Ltd., Ningbo (CN)

( * ) Notice: Subject to any disclaimer, the term of this patent is extended or adjusted under 35 U.S.C. 154(b) by 36 days.

(21) Appl. No.: 15/548,827

(22) PCT Filed: Jul. 22, 2016

(86) PCT No.: PCT/CN2016/000411
§ 371 (c)(1),
(2) Date: Aug. 4, 2017

(87) PCT Pub. No.: WO2017/177352
PCT Pub. Date: Oct. 19, 2017

(65) Prior Publication Data
US 2018/0106110 A1 Apr. 19, 2018

(30) Foreign Application Priority Data

Apr. 13, 2016 (CN) .......................... 2016 1 0229137

(51) Int. Cl.
*E21B 7/00* (2006.01)
*E21B 6/02* (2006.01)
*A01K 97/01* (2006.01)

(52) U.S. Cl.
CPC ................ *E21B 7/008* (2013.01); *E21B 6/02* (2013.01); *A01K 97/01* (2013.01)

(58) Field of Classification Search
CPC ... E21B 7/008; E21B 4/10; E21B 6/00; E21B 6/02; E21B 6/04; E21B 6/06; E21B 6/08; A01K 97/01
See application file for complete search history.

(56) References Cited

U.S. PATENT DOCUMENTS

| 3,866,692 A | * | 2/1975 | Stelljes | ................ | B23B 45/008 173/110 |
| 2010/0074702 A1 | * | 3/2010 | Kluge | .................... | A01K 97/01 408/125 |

* cited by examiner

*Primary Examiner* — D. Andrews
*Assistant Examiner* — Yanick A Akaragwe
(74) *Attorney, Agent, or Firm* — Wang Law Firm, Inc.

(57) ABSTRACT

The present invention discloses an impact ice driller, which comprises a frame; a motor; a rotatable drill stem; a stationary element and a rotatable element disposed along a same axis and facing each other; wherein the stationary element is connected to the frame; the rotatable element is connected to the drill stem and synchronously moves with the drill stem as driven by the motor; the stationary element and the rotatable element each has an irregular surface capable of engaging with each other on each opposite surface, when the rotatable element rotates, the irregular surface of the stationary element and the irregular surface of the rotatable element can repeat engagement and separation, so that the rotatable element can repeat the movement along an axis relative to the stationary element. In this way, the drill stem can produce up-and-down impacts on ice cover ceaselessly in the ice drilling process with good ice drilling effect.

9 Claims, 7 Drawing Sheets

IMPACT ICE DRILLER

RELATE APPLICATIONS

This application is a national phase entrance of and claims benefit to PCT Application for an impact ice driller, PCT/CN2016/000411, filed on Jul. 22, 2016, which claims benefit to Chinese Patent Application 201610229137.3, filed on Apr. 13, 2016. The specifications of both applications are incorporated here by this reference.

FIELD OF THE INVENTION

The present invention relates to a mechanical device for drilling ice, and in particular, to an impact ice driller.

DESCRIPTION OF THE PRIOR ART

In the past, people usually drilled ice by hand using a chisel to drill an opening or a hole in ice cover. Drilling ice by hand not only takes time and energy, but also has poor ice drilling effect with difficulty in drilling an ideal ice hole. To overcome this shortcoming of drilling ice by hand, various automatic ice drillers have been invented. An exiting automatic ice driller generally comprises a frame, a motor, and a drill, with the motor being mounted on the frame and the drill being mounted on an output shaft of the motor. When an ice driller is put into service, it is placed upright on an ice surface, and then its motor is turned on to drive a drill to rotate, with the drill rotating in ice cover to achieve the whole ice drilling process. While an existing automatic ice driller achieves automatic operation with greatly improved working efficiency, the drill and the output shaft of the motor thereof are in fixed connection with each other, so that the drill cannot axially reciprocate relative to the output shaft of the motor; therefore, the drill can plane ice only by rotating when drilling the ice; that is, the drill cannot generate an impact on the ice cover in the up-and-down direction while rotating. In addition, due to the slippery and crisp characteristics of the ice cover, the drill is very likely to slip when rotating in the ice cover, thereby leading to poor ice drilling effect.

SUMMARY OF THE INVENTION

A first technical problem to be solved by the present invention is to provide an impact ice driller having good ice drilling effect in view of the above-mentioned current situation in the prior art.

A second technical problem to be solved by the present invention is to provide an impact ice driller which is more reasonable in structure and better in hand feeling during use.

To solve the first technical problem mentioned above, the impact ice driller comprises a frame; a motor disposed on the frame; a rotatable drill stem connected to and driven by the motor; a stationary element connected to the frame; and a rotatable element connected to the drill stem and synchronously move with the drill stem as driven by the motor; wherein the stationary element and the rotatable element are disposed along a same axis and facing each other; the stationary element and the rotatable element each has an irregular surface capable of engaging with each other on each opposite surface, when the rotatable element rotates, the irregular surface of the stationary element and the irregular surface of the rotatable element can repeat engagement and separation, so that the rotatable element can repeat the movement along an axis relative to the stationary element.

Preferably, the stationary element is a stationary ratchet wheel, while the rotatable element is a rotary ratchet wheel.

Preferably, the stationary element has a first tooth portion and the rotatable element has a second tooth portion on the opposite surface, the first tooth portion and the second tooth portion can be engaged with each other, and the first tooth portion and the second tooth portion respectively form the irregular surfaces. Certainly, in addition to the tooth structures that can be engaged with each other, the irregular surfaces can also be other concave and convex structures capable of matching with each other up and down, or can be inclined surface structures capable of matching with each other up and down.

Preferably, the first tooth portion further comprises a plurality of teeth, each tooth is formed by a first inclined surface and a second inclined surface, the first inclined surface and a second inclined surface have different gradient, the second tooth portion further comprises a plurality of teeth, each tooth is formed by a third inclined surface and a fourth inclined surface, the third inclined surface and the fourth inclined surface have different gradient. This is conductive to setting the rotary ratchet wheel by rotating the same in one direction after the first tooth portion is engaged with the second tooth portion.

Various connection structures can be used between the output shaft of the motor and the rotary ratchet wheel. Preferably, the output shaft of the motor is connected to a splined shaft, and the rotary ratchet wheel is engaged with the splined shaft and moves axially relative to the splined shaft.

To further solve the second technical problem mentioned above, preferably, an elastic element is disposed adjacent to the rotary ratchet wheel, and the elastic element keeps the stationary ratchet wheel and the rotary ratchet wheel separated from each other.

Preferably, the stationary ratchet wheel and the rotary ratchet wheel are both disposed coaxially with the splined shaft.

To limit the stationary ratchet wheel and the splined shaft, preferably, a first shaft sleeve is mounted above the stationary ratchet wheel, and a second shaft sleeve is mounted inside the stationary ratchet wheel, he splined shaft extends through the first shaft sleeve and the second shaft sleeve.

Preferably, the drill stem is connected to the rotary ratchet wheel through a first connecting shaft that is disposed below the splined shaft, and the elastic element is a first pressure spring with an upper end of the first spring abutting against the splined shaft and a lower end of the first spring abutting against the first connecting shaft.

Preferably, to limit the rotary ratchet wheel, a limiting barrel fixed to the frame is disposed around the rotary ratchet wheel with a third shaft sleeve and a fourth shaft sleeve mounted inside the limiting barrel; the third shaft sleeve slides over an upper end portion of the rotary ratchet wheel, and the fourth shaft sleeve is located below the rotary ratchet wheel; an upper end of the first connecting shaft extends through the fourth shaft sleeve and connects to the rotary ratchet wheel with a space separating the fourth shaft sleeve from the rotary ratchet wheel and for the rotary ratchet wheel to move downwardly.

Preferably, the rotary ratchet wheel is disposed coaxially with the stationary ratchet wheel with the axial direction of the stationary ratchet wheel and the rotary ratchet wheel parallel to that of the splined shaft.

Preferably, the drill stem is fixedly connected to the rotary ratchet wheel through a second connecting shaft with the stationary ratchet wheel and the rotary ratchet wheel both mounted on the second connecting shaft; the elastic element is a second pressure spring sleeved over the second connecting shaft with an upper end of the second pressure spring abutting against the stationary ratchet wheel and a lower end of the second pressure spring abutting against rotary ratchet wheel.

The stationary ratchet wheel can be of a plurality of mounting structures. Preferably, a connecting plate is fixed to the frame with a first mounting hole and a second mounting hole adjacent to each other, the stationary ratchet wheel is mounted in the first mounting hole, the splined shaft extends through the second mounting hole and engages the rotary ratchet wheel.

Preferably, to facilitate operation of a user, two handles are mounted on the frame, and the two handles are disposed on the left and right sides of the frame, respectively, respectively, the motor switches are mounted on the handles.

Compared with the prior art, the present invention has the following advantages: the stationary element and the rotatable element of the impact ice driller each has a irregular surface capable of engaging with each other on each opposite surface, when the rotatable element rotates, the irregular surface of the stationary element and the irregular surface of the rotatable element can repeat engagement and separation, so that the rotatable element can repeat the movement along an axis relative to the stationary element. In this way, the drill stem can produce up-and-down impacts on ice cover ceaselessly in the ice drilling process with good ice drilling effect. Besides, with an elastic element disposed between the stationary element and the rotatable element keeping the rotatable element and the stationary element separated from each other, more reasonable structure of the ice driller and better hand feeling during use are achieved; in addition, abnormal sound produced by collision of the rotatable element with the stationary element when carried can be avoided, and mutual engagement of the stationary element and the rotatable element during idling of the motor can also avoided, thus being conductive to prolonging of service life of the ice driller.

DETAILED DESCRIPTION OF THE PREFERRED EMBODIMENT

Figure 1:
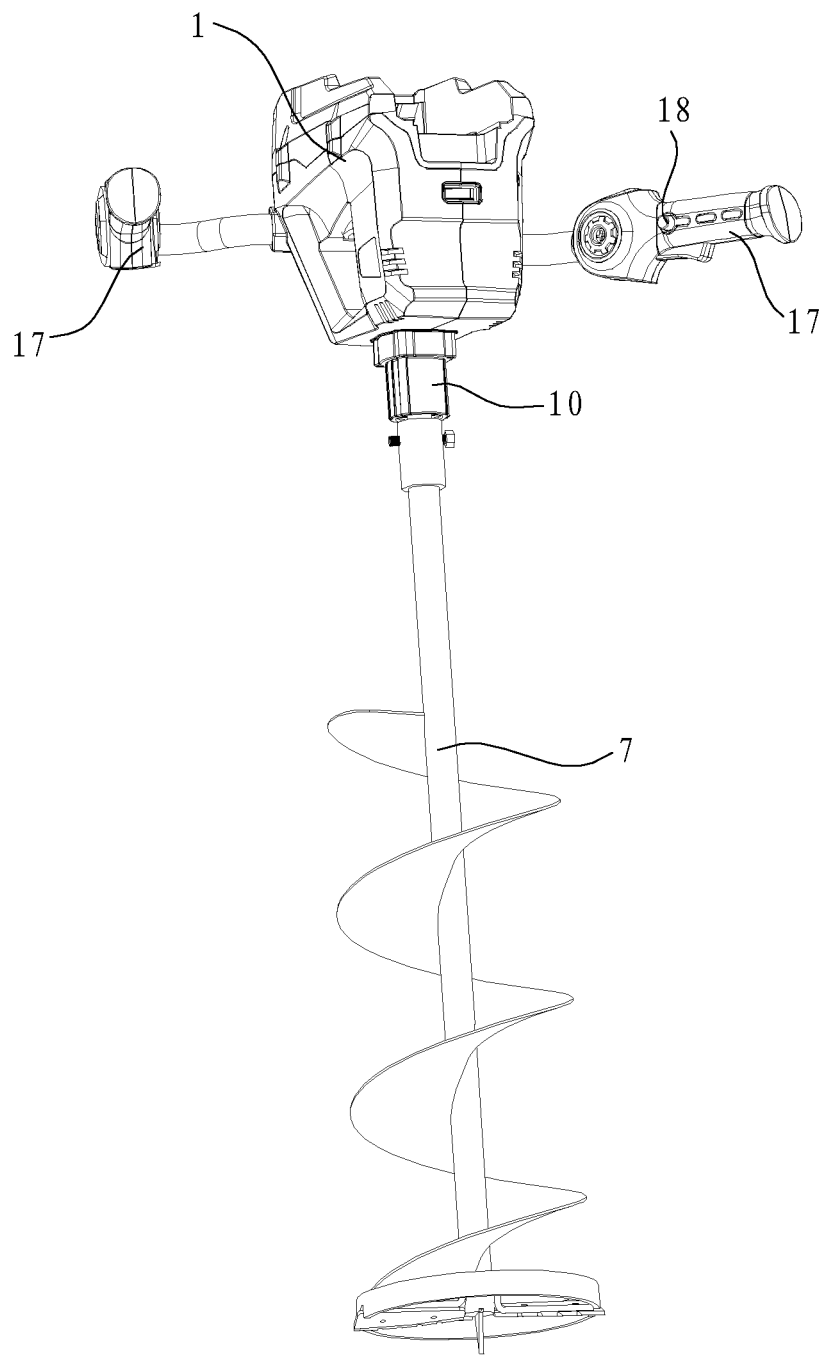
FIG. 1 is a perspective view of an impact ice driller according to an Embodiment 1 of the present invention.
Figure 2:
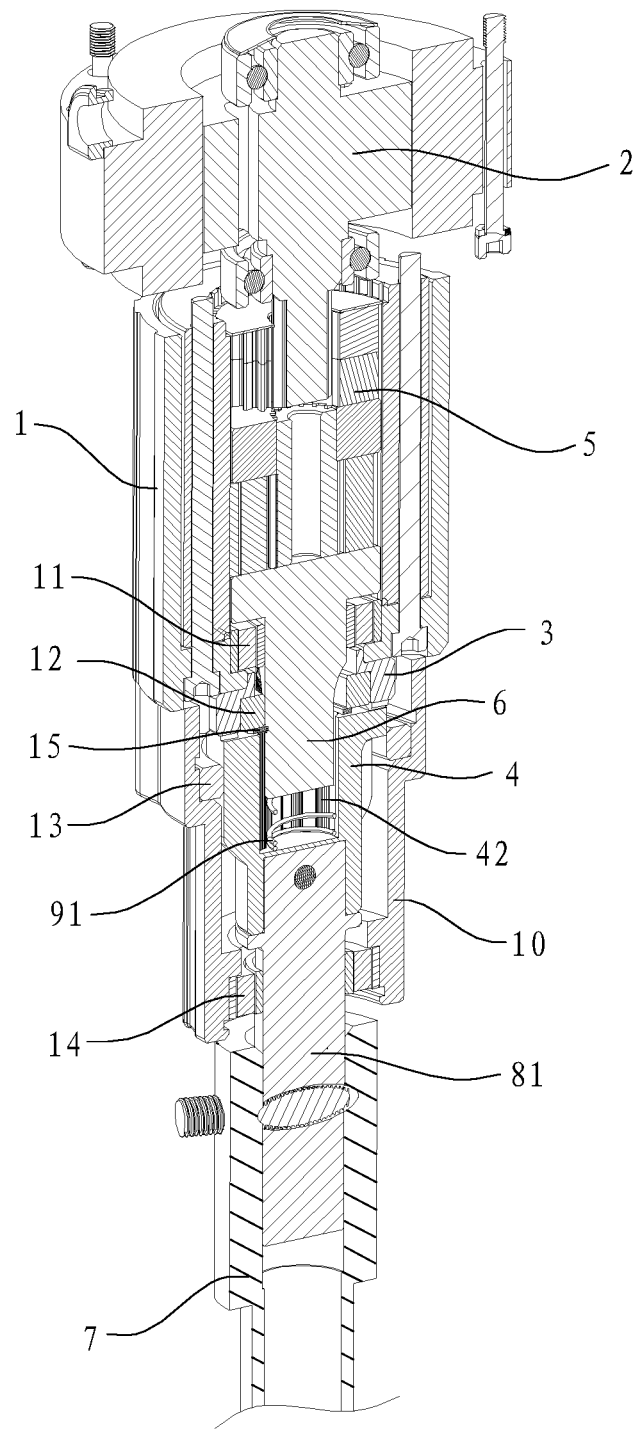
FIG. 2 is a sectional view of the impact ice driller according to the Embodiment 1 of the present invention (partial cutting off).

To enable a further understanding of the innovative and technological content of the invention herein refer to the detailed description of the invention and the accompanying drawings below:

Embodiment 1

FIG. 1-FIG. 5 show a first embodiment of the present invention. The impact ice driller of the present embodiment comprises the following major components: a frame 1, a motor 2, a stationary ratchet wheel 3, a rotary ratchet wheel 4, a coupling 5, a splined shaft 6, a drill stem 7, a first connecting shaft 81, a first pressure spring 91, a limiting barrel 10, a first shaft sleeve 11, a second shaft sleeve 12, a third shaft sleeve 13, a fourth shaft sleeve 14, a retaining washer 15, and two handles 17.

The motor 2 is mounted on the frame 1 and the output shaft of the motor 2 is connected to the upper end of the splined shaft 6 through the coupling 5. The stationary ratchet wheel 3 and the rotary ratchet wheel 4 are both disposed coaxially with the splined shaft 6, and the stationary ratchet wheel 3 is located above the rotary ratchet wheel 4. The stationary ratchet wheel 3 is fixed to the frame 1, and the first shaft sleeve 11 is mounted above stationary ratchet wheel 3 and the second shaft sleeve 12 is mounted inside the stationary ratchet wheel 3, the splined shaft 6 extends through the first shaft sleeve 11 and the second shaft sleeve 12. The retaining washer 15 is sleeved on the splined shaft 6 and is mounted at the bottom of the second shaft sleeve 12. An internal keyway 42 matching with the splined shaft 6 is formed within the rotary ratchet wheel 4. A lower end of the splined shaft 6 extends into the inner hole of the rotary ratchet wheel 4 and is engaged with the internal keyway 42 so that the motor 2, when rotating, can drive the rotary ratchet wheel 4 to rotate synchronously.

Figure 3:
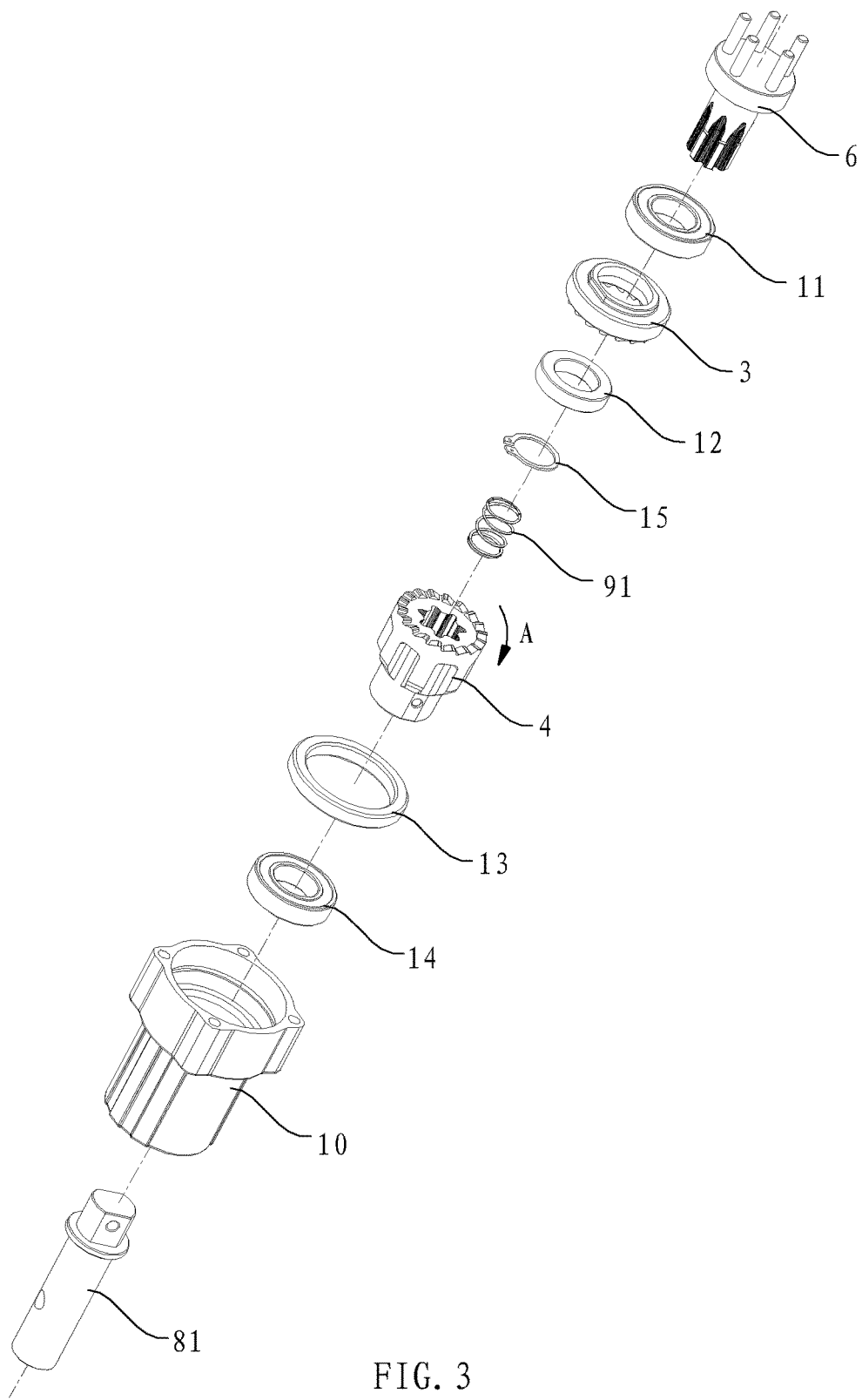
FIG. 3 is an exploded view of the Embodiment 1 of the present invention.
Figure 4:
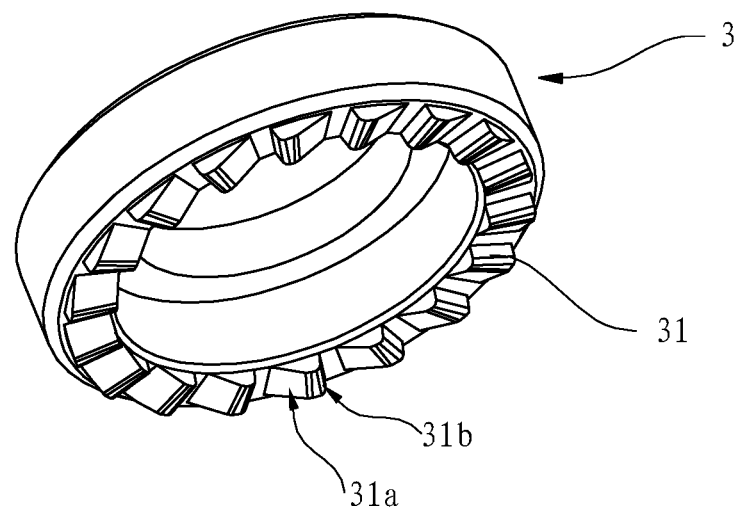
FIG. 4 is a perspective view of a stationary ratchet wheel according to the Embodiment 1 of the present invention.
Figure 5:
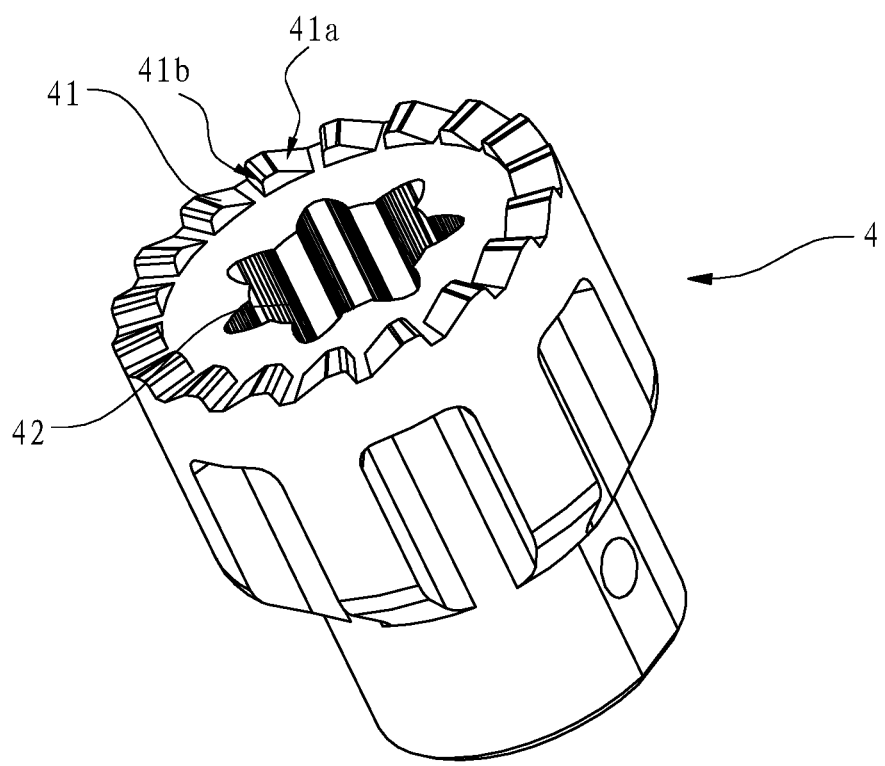
FIG. 5 is a perspective view of a rotary ratchet wheel according to the Embodiment 1 of the present invention.

In the present embodiment, a tooth portion 31 is formed in the circumferential direction of a bottom surface of the stationary ratchet wheel 3, and a second tooth portion 41 capable of being engaged with the first tooth portion 31 is formed in the circumferential direction of a top surface of the rotary ratchet wheel 4, and the first tooth portion 31 and the second tooth portion 41 respectively form one irregular surface on the stationary ratchet wheel 3 and the rotary ratchet wheel 4, which are opposite with each other. As shown in FIGS. 4 and 5, the first tooth portion 31 comprises a plurality of teeth, each tooth is formed by a first inclined surface 31a and a second inclined surface 31b in a direction of rotation, the first inclined surface 31a and a second inclined surface 31b have different gradient (preferably a great difference between their gradients). Correspondingly, the second tooth portion 41 further comprises a plurality of teeth, each tooth is formed by a third inclined surface 41a and a fourth inclined surface 41b in the direction of rotation, and the third inclined surface 41a and the fourth inclined surface 41b can be engaged with the corresponding inclined surfaces 31a and 31b in the first tooth portion 31 as their gradients are adaptive to each other, thereby being conductive to setting the rotary ratchet wheel 4 to rotate in only one direction after the first tooth portion 31 is engaged with the second tooth portion 41, as shown in FIG. 3, being conductive to setting the rotary ratchet wheel 4 to rotate in the direction of arrow A. When the motor rotates, the irregular surface of the first tooth portion 31 and the irregular surface of the second tooth portion 41 can repeat engagement and separation, so that the rotary ratchet wheel 4 can repeat the movement along an axis and can be engaged with the splined shaft 6.

In the present embodiment, the stationary ratchet wheel 3 is a preferred embodiment for a stationary element, and the rotary ratchet wheel 4 is a preferred embodiment for a rotatable element. In addition to the structures of the first tooth portion 31 and the second tooth portion 41, the irregular surfaces on opposite surfaces of the stationary element and the rotatable element can also be other concave and convex structures matching with each other up and down, or can be inclined surface structures matching with each other up and down as long as the rotatable element can move up and down along an axis relative to the stationary element when the surface of the stationary element and the surface of the rotatable element which are opposite with each other repeat engagement and separation The drill stem 7 is connected to the rotary ratchet wheel 4 through the first connecting shaft 81, and the drill stem 7, the first connecting shaft 81 and the rotary ratchet wheel 4 can synchronously move with each other when the motor 2 rotates. The first connecting shaft 81 is disposed below the splined shaft 6. An upper end of the first pressure spring 91 abuts against a bottom surface of the splined shaft 6, and a lower end of the first pressure spring 91 abuts against a top surface of the first connecting shaft 81. As the stationary ratchet wheel 3 keeps still relative to the splined shaft 6 and the rotary ratchet wheel 4 is fixed to the first connecting shaft 81, the first pressure spring 91 as an elastic element can keep the rotary ratchet wheel 4 and the stationary ratchet wheel 3 separated from each other. Under combined action of external force and the first pressure spring 91, the rotary ratchet wheel 4 can be engaged with the splined shaft 6 and move axially relative to the splined shaft 6. The rotary ratchet wheel 4 can contact with the stationary ratchet wheel 3 by axially moving upwardly, and can separate from the stationary ratchet wheel 3 by axially moving downwardly.

The ice driller can also limit the axial movements of the rotary ratchet wheel 4 and the drill stem 7. Specifically, the limiting barrel 10 fixed to the frame 1 is sleeved outside the rotary ratchet wheel 4. The third shaft sleeve 13 and the fourth shaft sleeve 14 are mounted inside the limiting barrel 10. The third shaft sleeve 13 slides over an upper end portion of the rotary ratchet wheel 4, and the fourth shaft sleeve 14 is located below the rotary ratchet wheel 4. An upper end of the first connecting shaft 81 extends through the fourth shaft sleeve 14 and is fixed to the rotary ratchet wheel 4 with a space separating the fourth shaft sleeve 14 from the rotary ratchet wheel 4 for the rotary ratchet wheel 4 and the drill stem 7 to move downwardly.

In addition, the impact ice driller has two handles 17 mounted on the left side and right side of the frame 1, respectively. Motor switches 18 are mounted on the handles 17, which is very convenient for operation.

When the impact ice driller operates, an operator holds the handles 17 and turns on the motor 2. The motor 2 drives the rotary ratchet wheel and the drill stem 7 to rotate. The drill stem 7 is capable of axially reciprocating through matching of the second tooth portion 41 of the rotary ratchet wheel 4 with the first tooth portion 31 of the stationary ratchet wheel 3 in the rotating process of the rotary ratchet wheel 4, thereby realizing the movement of impact ice drilling. In the event that no external force is applied or the applied external force is insufficient to overcome the elastic force of the first pressure spring 91, the elastic force produced by the first pressure spring 91 can enable the rotary ratchet wheel 4 to move in a direction away from the stationary ratchet wheel 3, thereby avoiding the engagement of the rotary ratchet wheel 4 and stationary ratchet wheel 3 with each other.

Embodiment 2

Figure 6:
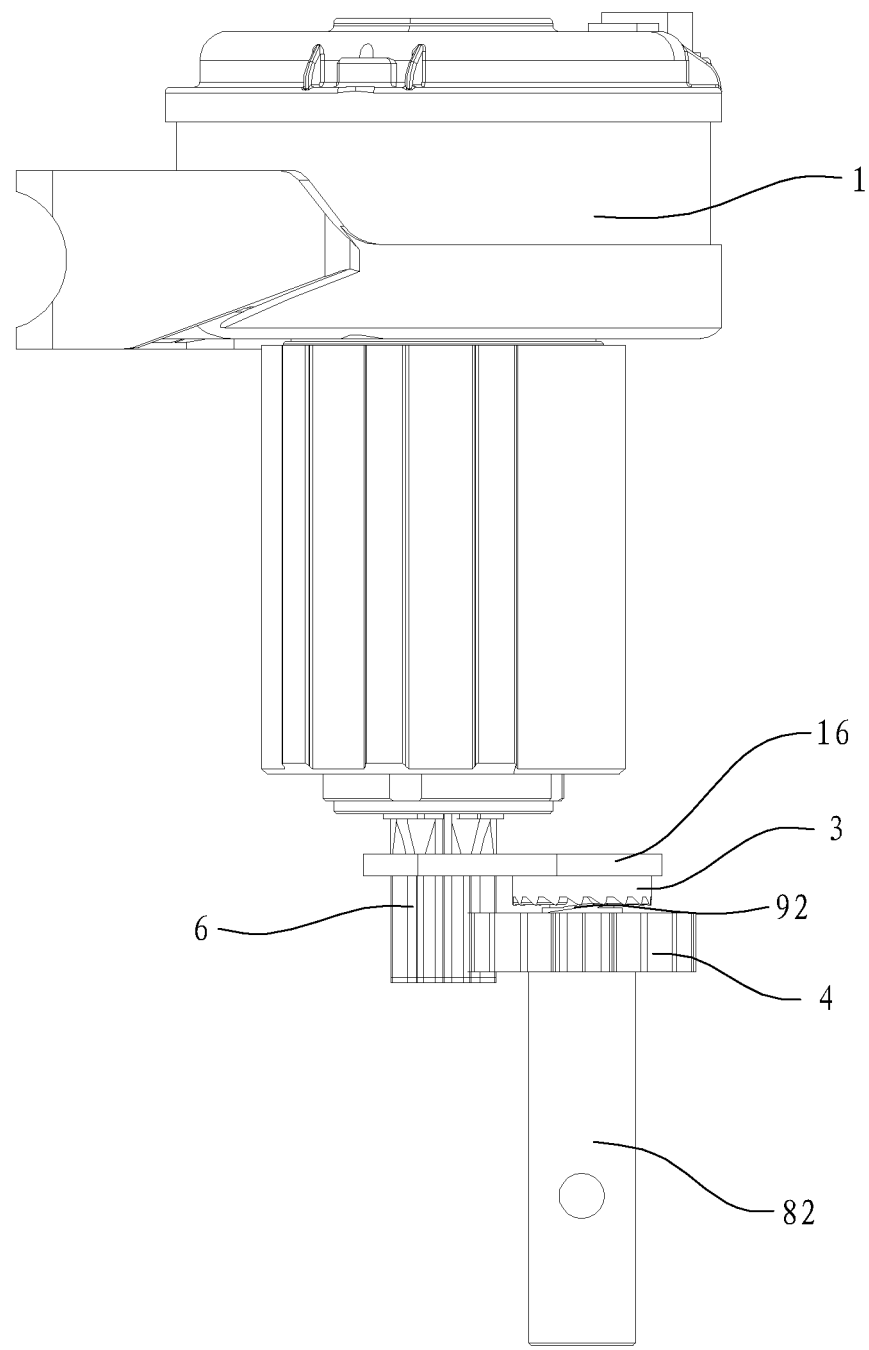
FIG. 6 is a side view of partial of an impact ice driller according to an Embodiment 2 of the present invention.
Figure 7:
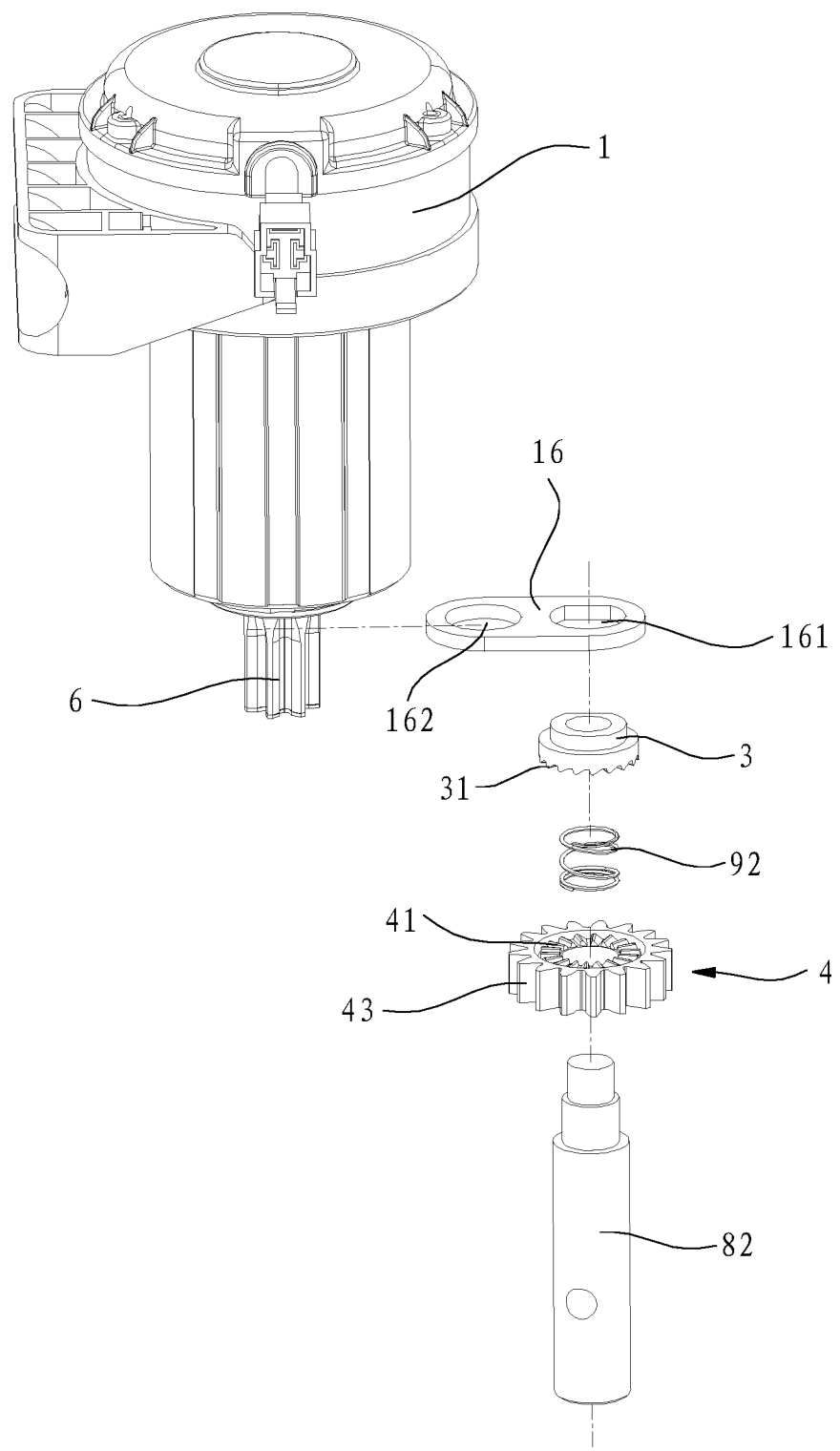
FIG. 7 is an exploded view of partial of the impact ice driller according to the Embodiment 2 of the present invention.
Figure 8:
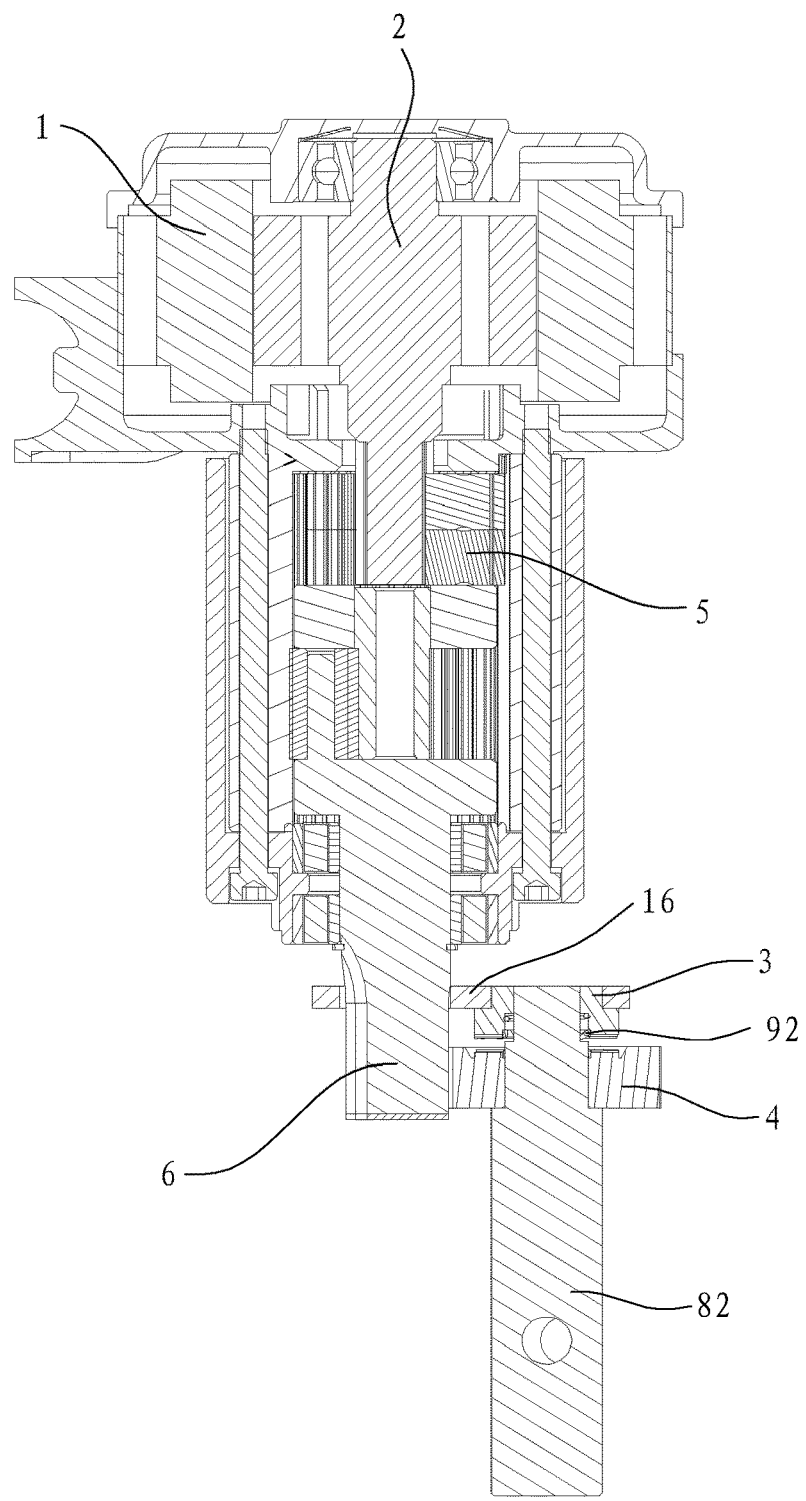
FIG. 8 is a sectional view of partial of the impact ice driller according to the Embodiment 2 of the present invention.

FIG. 6-FIG. 8 show a second embodiment of the impact ice driller of the present invention. The difference of this embodiment compared with the first embodiment is the structure for mounting of the stationary ratchet wheel and the rotary ratchet wheel. In the present embodiment, the rotary ratchet wheel 4 is disposed coaxially with the stationary ratchet wheel 3 with the axial direction of the stationary ratchet wheel 3 and the rotary ratchet wheel 4 parallel to that of the splined shaft 6. A connecting plate 16 is fixed to the frame 1 with a first mounting hole 161 and a second mounting hole 162 adjacent to each other. The stationary ratchet wheel 3 is mounted in the first mounting hole 161, and the rotary ratchet wheel 4 is located below the connecting plate 16. An external keyway 43 is formed in an outer periphery wall of the rotary ratchet wheel 4. The splined shaft 6 extends through the second mounting hole 162 and engages the rotary ratchet wheel 4.

In the present embodiment, the drill stem 7 is fixedly connected to the rotary ratchet wheel 4 through a second connecting shaft 82, and the drill stem 7, the second connecting shaft 82 and the rotary ratchet wheel 4 can rotate synchronously when the motor 2 rotates. The stationary ratchet wheel 3 and the rotary ratchet wheel 4 are both mounted on the second connecting shaft 82. A second pressure spring 92 slides over the second connecting shaft 82 with an upper end of the second pressure spring 92 abutting against the stationary ratchet wheel 3 and a lower end of the second pressure spring 92 abutting against rotary ratchet wheel 4. In this way, the second pressure spring 92 as an elastic element can keep the rotary ratchet wheel 4 and the stationary ratchet wheel 3 separated from each other.

For the working process of the impact ice driller in embodiment 2, reference may be made to that of the impact ice driller in embodiment 1, which is not described redundantly herein.

The invention claimed is:

1. An impact ice driller, comprising:
   a frame;
   a motor disposed on the frame; and
   a rotatable drill stem connected to and driven by the motor;
   a stationary element connected to the frame; and
   a rotatable element connected to the drill stem and synchronously moving with the drill stem as driven by the motor,
   wherein the stationary element and the rotatable element are disposed along a same axis and facing each other;
   the stationary element and the rotatable element each have an irregular surface capable of engaging with each other on each opposite surface, when the rotatable element rotates, the irregular surface of the stationary element and the irregular surface of the rotatable element can repeat engagement and separation, so that the rotatable element can repeat the movement along an axis relative to the stationary element;
   the stationary element is a stationary ratchet wheel;
   the rotatable element is a rotary ratchet wheel;
   an elastic element is disposed adjacent to the rotary ratchet wheel, the elastic element keeps the stationary ratchet wheel and the rotary ratchet wheel separated from each other;

an output shaft of the motor is connected to a splined shaft, and the rotary ratchet wheel is engaged with the splined shaft and moves axially relative to the splined shaft, the stationary ratchet wheel and the rotary ratchet wheel are both disposed coaxially with the splined shaft;

a first shaft sleeve is mounted above the stationary ratchet wheel, and a second shaft sleeve is mounted inside the stationary ratchet wheel, the splined shaft extends through the first shaft sleeve and the second shaft sleeve.

2. The impact ice driller of claim 1, wherein the stationary element has a first tooth portion and the rotatable element has a second tooth portion on the opposite surface, the first tooth portion and the second tooth portion can be engaged with each other, and the first tooth portion and the second tooth portion respectively form the irregular surfaces.

3. The impact ice driller of claim 2, wherein the first tooth portion further comprises a plurality of teeth, each tooth is formed by a first inclined surface and a second inclined surface, the first inclined surface and a second inclined surface have different gradient, the second tooth portion further comprises a plurality of teeth, each tooth is formed by a third inclined surface and a fourth inclined surface, the third inclined surface and the fourth inclined surface have different gradient.

4. The impact ice driller of claim 1, wherein the drill stem is connected to the rotary ratchet wheel through a first connecting shaft disposed below the splined shaft, and the elastic element is a first pressure spring with an upper end of the first spring abutting against the splined shaft and a lower end of the first spring abutting against the first connecting shaft.

5. The impact ice driller of claim 4, wherein a limiting barrel fixed to the frame is disposed around the rotary ratchet wheel with a third shaft sleeve and a fourth shaft sleeve mounted inside the limiting barrel;

the third shaft sleeve slides over an upper end portion of the rotary ratchet wheel, and the fourth shaft sleeve is located below the rotary ratchet wheel;

an upper end of the first connecting shaft extends through the fourth shaft sleeve and connects to the rotary ratchet wheel with a space separating the fourth shaft sleeve from the rotary ratchet wheel and for the rotary ratchet wheel to move downwardly.

6. The impact ice driller of claim 1, wherein the rotary ratchet wheel is disposed coaxial with the stationary ratchet wheel with the axial direction of the stationary ratchet wheel and the rotary ratchet wheel parallel to that of the splined shaft.

7. The impact ice driller of claim 6, wherein the drill stem is fixedly connected to the rotary ratchet wheel through a second connecting shaft with the stationary ratchet wheel and the rotary ratchet wheel both mounted on the second connecting shaft;

the elastic element is a second pressure spring sliding over the second connecting shaft with an upper end of the second pressure spring abutting against the stationary ratchet wheel and a lower end of the second pressure spring abutting against the rotary ratchet wheel.

8. The impact ice driller of claim 7, wherein a connecting plate is fixed to the frame with a first mounting hole and a second mounting hole adjacent to each other, the stationary ratchet wheel is mounted in the first mounting hole, the splined shaft extends through the second mounting hole and engages the rotary ratchet wheel.

9. The impact ice driller of claim 1, wherein two handles are mounted on the frame, and the two handles are disposed on the left and right sides of the frame, respectively, the motor switches are mounted on the handles.

* * * * *